(12) United States Patent
Garner et al.

(10) Patent No.: US 9,788,111 B2
(45) Date of Patent: *Oct. 10, 2017

(54) AUDIO DEVICE WITH AUTOMATIC FAN CONTROL BASED ON A VOLUME LEVEL OF AUDIO CONTENT

(71) Applicant: Roku, Inc., Los Gatos, CA (US)

(72) Inventors: Gregory M. Garner, Los Gatos, CA (US); Joseph Hollinger, Los Gatos, CA (US)

(73) Assignee: Roku, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/455,520

(22) Filed: Mar. 10, 2017

(65) Prior Publication Data

US 2017/0188146 A1    Jun. 29, 2017

Related U.S. Application Data

(63) Continuation of application No. 14/926,713, filed on Oct. 29, 2015, now Pat. No. 9,621,989.

(51) Int. Cl.
*H04R 3/00*     (2006.01)
*H04R 29/00*    (2006.01)
*G11B 20/10*    (2006.01)

(52) U.S. Cl.
CPC .......... *H04R 3/007* (2013.01); *H04R 29/001* (2013.01); *G11B 20/10527* (2013.01); *G11B 2020/10787* (2013.01)

(58) Field of Classification Search
CPC ........................... H04R 3/007; H04R 2430/01
See application file for complete search history.

(56) References Cited

U.S. PATENT DOCUMENTS 9,311,909 B2    4/2016  Giaimo, III et al.
2003/0138115 A1  7/2003  Krochmal et al.

FOREIGN PATENT DOCUMENTS

JP           2001168646         6/2001

*Primary Examiner* — Muhammad N Edun
(74) *Attorney, Agent, or Firm* — Sterne, Kessler, Goldstein & Fox, PLLC

(57) ABSTRACT

Disclosed herein are system, method, and computer program product embodiments for maintaining a temperature of an audio device during playback of audio content without audio interference. An embodiment operates by receiving a data stream comprising audio content for playback. The audio device determines a volume level of the audio content using the data stream. The audio device then controls a cooling device based on the volume level compared to a threshold value. This reduces the amount of time the cooling device is turned on during playback of the audio content. This reduces audio interference, improves the user playback experience, and prevents overheating of the audio device which improves reliability and reduces audio device failure rate.

20 Claims, 5 Drawing Sheets

AUDIO DEVICE WITH AUTOMATIC FAN CONTROL BASED ON A VOLUME LEVEL OF AUDIO CONTENT

CROSS-REFERENCE TO RELATED APPLICATION

This application is a continuation of U.S. patent application Ser. No. 14/926,713, filed Oct. 29, 2015, now allowed, which is herein incorporated by reference in its entirety.

FIELD

The embodiments relate generally to cooling of audio devices such as streaming media players.

BACKGROUND

An audio device may be programmed to play a data stream comprising audio content. The data stream may be received over a computer network such as the Internet. The data stream may also be received from a local data source such as a hard disk drive. The data stream may be encoded in various data formats. For example, the data stream may be encoded as an ultra-high-definition (UHD) video.

But an audio device that is capable of playing a data stream encoded in various data formats may produce ambient noise during playback. This is because the audio device may need to turn on a fan to prevent the audio device from overheating. This may be the case when the audio device is a small form factor device. This ambient noise may cause distortion in the playback of audio content.

BRIEF SUMMARY

Embodiments for maintaining a temperature of an audio device within certain parameters during playback of audio content in a manner that decreases or eliminates audio interference are described herein. In an embodiment, a method operates by receiving or otherwise accessing a data stream comprising audio content for playback. The audio device determines a volume level of the audio content using the data stream. The audio device then controls a cooling device by comparing the volume level to a threshold value. This reduces or eliminates the amount of time the cooling device is turned on during playback of certain portions of the audio content. This also reduces audio interference and improves the user playback experience. Furthermore, this prevents overheating of the audio device which improves reliability and reduces a failure rate of the audio device.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for maintaining a temperature of an audio device within certain parameters during playback of audio content in a manner that decreases or eliminates audio interference.

Figure 1:
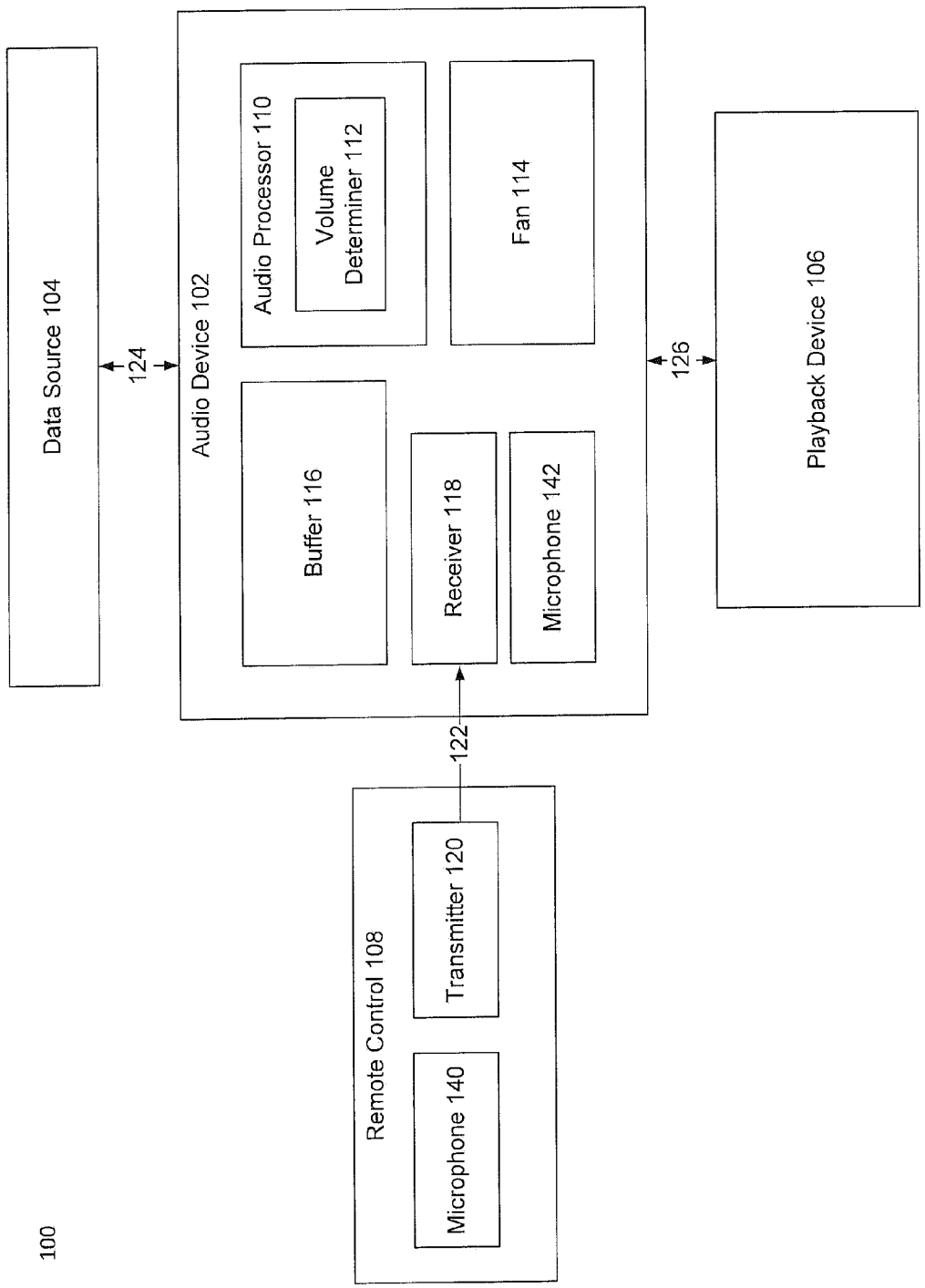
FIG. 1 is a block diagram of a system for maintaining a temperature of an audio device during playback of data comprising audio content, according to an example embodiment.

FIG. 1 illustrates system 100, according to an example embodiment. System 100 includes an audio device 102, a data source 104, a playback device 106, and a remote control 108.

In FIG. 1, audio device 102 may comprise any electronics device having the ability to output audio content. For example, audio device 102 may be a television, set top box, audio/video (AV) receiver, digital versatile disc (DVD) player, Blue-ray Disc (BD) player, cable box, media streaming player, computer, cell phone, tablet computer or other multimedia and/or consumer electronics device.

Audio device 102 may be connected to a data source 104 over communications link 124. Data source 104 may be coupled to audio device 102 via a communications network or medium such as the Internet, cable TV, satellite, etc. In another embodiment, data source 104 may be a local data source such as a hard disk drive, optical disc, DVD, flash memory device, or various other types of local data sources as would be appreciated by a person of ordinary skill in the art. Data source 104 may store a data stream comprising audio content for playback. For example, data source 104 may store a UHD movie or an MPEG-1 Audio Layer III (MP3) song.

Audio device 102 may receive or otherwise access a data stream comprising audio content for playback from data source 104 over communications link 124. The data stream may be encoded in various data formats. For example, the data stream may be encoded as a UHD video, DVD video, MP3 audio file, Windows Media Audio (WMA) audio file, or various other data formats.

Communications link 124 may be a wired or wireless communication link. In an embodiment, communications link 124 may be a unidirectional communications link in which data may be transferred from data source 104 to audio device 102, but may not be transferred from audio device 102 to data source 104. In another embodiment, communications link 124 may be a bidirectional communications link in which data may be transferred to and from audio device 102.

Audio device 102 may include an audio processor 110, fan 114, buffer 116, and receiver 118. In an embodiment, audio device 102 may store a portion of a data stream comprising audio content for playback in buffer 116. In an embodiment, buffer 116 may be a random access memory (RAM). In another embodiment, buffer 116 may be a hard disk drive. In an embodiment, audio device 102 may store the next 60 to 90 seconds of a data stream (or some other amount of the data stream) in buffer 116. Audio device 102 may also have a microphone 142.

In FIG. 1, audio processor 110 may decode a data stream received from data source 104. In an embodiment, audio processor 110 may be a processor based on an Acorn RISC Machine (ARM) processor architecture, an x86 processor architecture, a Scalable Processor Architecture (SPARC), a Microprocessor without Interlocked Pipeline Stages (MIPS) processor architecture, or various other types of processor architectures as would be appreciated by a person of ordinary skill in the art. In an embodiment, audio processor 110 decodes some or all of the portion of the data stream stored in buffer 116. In another embodiment, audio processor 110 decodes a data stream in real-time from data source 104.

In an embodiment, audio processor 110 may decode a data stream encoded in a UHD data format, Flash Video (FLV) data format, QuickTime data format, Windows Media Video (WMV) data format, MP3 data format, WMA data format, HLS (HTTP Live Streaming) or various other audio/video and/or streaming formats as would be appreciated by a person of ordinary skill in the art. In an embodiment, audio processor 110 may normalize the volume level of a data stream, apply video filters to a data stream, apply audio filters to a data stream, or apply other effects to a data stream as would be appreciated by a person of ordinary skill in the art.

Audio processor 110 may include a volume determiner 112. Volume determiner 112 may determine a volume level of audio content of the data stream. In an embodiment, volume determiner 112 may determine a volume level of audio content while audio processor 110 decodes the data stream. In another embodiment, volume determiner 112 may determine a volume level of audio content after audio processor 110 decodes the data stream.

In an embodiment, volume determiner 112 may determine a volume level of audio content using a data stream by analyzing the audio content in buffer 116 before playback on playback device 106. For example, volume determiner 112 may analyze the next 60 to 90 seconds of a data stream (or some other portion of the data stream) stored in buffer 116. In an embodiment, volume determiner 112 may determine the amplitude of audio content in the data stream while audio processor 110 decodes the data stream from buffer 116. In another embodiment, volume determiner 112 may determine the amplitude of audio content in the data stream after audio processor 110 decodes the data stream from buffer 116. As would be appreciated by a person of ordinary skill in the art, volume determiner 112 may determine an amplitude of audio content in the data stream based on the data format of the data stream.

In another embodiment, volume determiner 112 may determine a volume level of audio content using crowd sourced data associated with a data stream. For example, volume determiner 112 may analyze crowd sourced data included in or provided with the data stream. In an embodiment, this crowd sourced data may include data indicating an amplitude value of audio content at a given time instance during playback of the data stream. In an embodiment, this crowd sourced data may be represented as a timeline of volume information for the data stream.

In an embodiment, audio device 102 may include a fan 114. As would be appreciated by a person of ordinary skill in the art, fan 114 may be another type of cooling device such as a water cooling pump. Fan 114 may regulate a temperate of audio device 102. Specifically, audio device 102 may turn on fan 114 when a temperature of audio device 102 crosses a temperature threshold value. This temperature threshold value may represent a temperature at which the audio device 102 may overheat. Audio device 102 may prevent overheating by turning on fan 114 when a temperature of audio device 102 crosses this temperature threshold value. This may improve the reliability and reduce a failure rate of audio device 102.

But turning on fan 114 may cause audio interference when audio device 102 plays back audio content in a data stream. Specifically, when audio device 102 turns on fan 114 it may generate various types of noise. This noise may interfere with playback of audio content in a data stream. For example, when audio device 102 plays back audio content with a low volume level, this noise may reduce or interfere with the playback clarity of audio content in a data stream.

In an embodiment, audio device 102 may adjust a power state of fan 114 based on a volume level of audio content of a data stream crossing a threshold value. As would be appreciated by a person of ordinary skill in the art, adjusting a power state of fan 114 may include turning off fan 114, turning on fan 114, or modulating the speed of fan 114. In an embodiment, audio device 102 may turn on fan 114 when a volume level of audio content of a data stream is above the threshold value and turn off fan 114 (or reduce the speed of fan 114) when a volume level of audio content of a data stream is below the threshold value. This may result in reducing audio interference caused by fan 114.

In an embodiment, this threshold value may be based on audio content of a data stream and playback device 106. Specifically, this threshold value may balance volume characteristics of the audio content of the data stream and volume characteristics of playback device 106. In an embodiment, audio device 102 may set a threshold value based on the determined volume level of audio content of a data stream. In another embodiment, audio device 102 may set a threshold value based on volume characteristics of playback device 106, to achieve audio clarity during playback of the audio content. For example, audio device 102 may set a threshold value to a value lower than necessary for playing audio content of a data stream because playback device 106 is set to a low volume level. In another embodiment, audio device 102 may set a threshold value based on thermal characteristics of audio device 102; in this case, the threshold value would balance the desire for audio clarity versus the goal of preventing audio device 102 from overheating.

Thus, as would be appreciated by a person of ordinary skill in the art, audio device 102 may set a threshold value to balance volume characteristics of audio content of a data stream, thermal characteristics of audio device 102, and volume characteristics of playback device 106, or any combination thereof. The threshold value may be preset in audio device 102 and/or configurable by a user of audio device 102.

In an embodiment, the determined volume level of audio content of a data stream may be based on the next 60 to 90 seconds of audio content in buffer 116. As would be appreciated by a person of ordinary skill in the art, various other intervals of time may be utilized. In another embodiment, the determined volume level may be based on crowd sourced data included in or provided with or applicable to the data stream comprising the audio content for playback.

In an embodiment, such crowd sourced data may indicate a volume level of the audio content at various time instances of the streaming content. In another embodiment, the crowd sourced data may include data indicating when audio device 102 may turn on fan 114 at various time instances of audio content playback without causing audio interference. Specifically, this crowd sourced data may be represented as a timeline of volume information for the data stream.

In an embodiment, crowd sourced data may be generated prior to playback of the audio content. Specifically, in an embodiment, a content creator, listener, or various other persons as would be appreciate by a person of ordinary skill in the art may generate the crowd sourced data by indicating a volume level at time portions of the audio content. In another embodiment, a content creator, listener, or various other persons as would be appreciated by a person of ordinary skill in the art may generate the crowd sourced data by indicating when audio device 102 may turn on fan 114 during playback of audio content of a data stream without causing audio interference.

Figure 5:
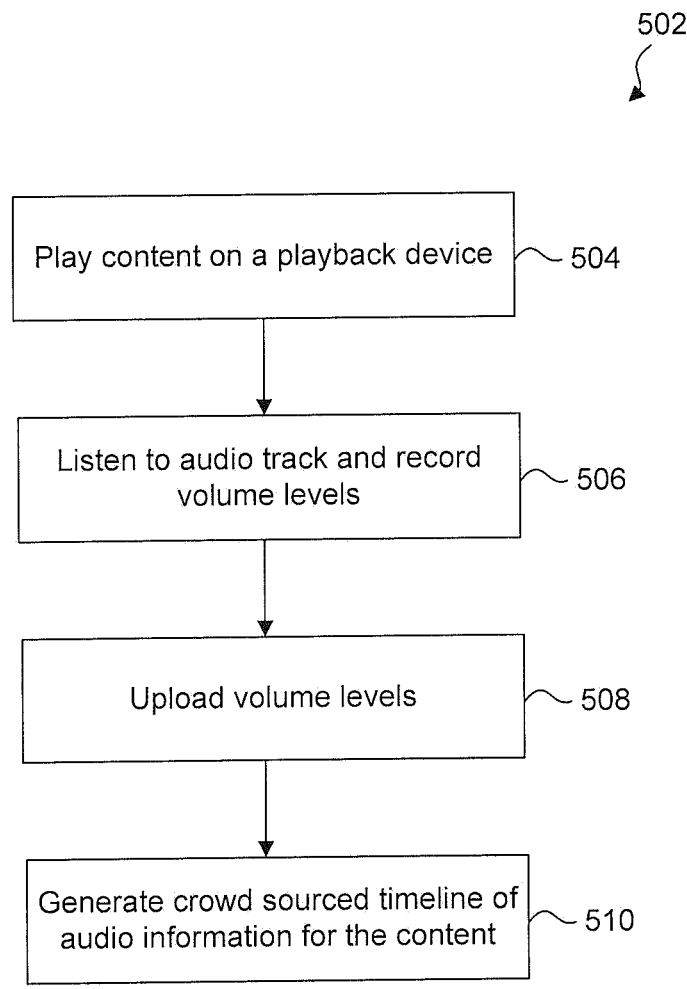
FIG. 5 is a flowchart illustrating a process for generating crowd sourced audio volume data for audio content, according to an example embodiment.

In another embodiment, as shown in flowchart 502 of FIG. 5, crowd sourced data may be automatically generated when the streaming content is played back. For example, in step 504, the streaming content is played on a playback device, such as playback device 106 in FIG. 1. In step 506, a microphone 142 in audio device 102 listens to the playback of the audio track. The audio processor 110 records the volume levels at intervals of the audio track to thereby generate a timeline of volume information for the data stream. Alternatively, a microphone 140 in remote control 108 can listen to the playback of the audio track and provide such volume data to audio device 102 via the communication link 122 between remote control 108 and audio device 102. In step 508, audio device 102 uploads the audio information obtained in step 506 to a central server. Steps 504-508 may be performed in multiple systems 100. In step 510, the central server (or some other computing device) may generate a crowd sourced timeline of audio information for the content using the audio information provided by systems 100 through performance of steps 504-508. For example, the central server may average such audio information to generate the crowd sourced timeline of audio information for the content.

In an embodiment, audio device 102 may adjust a power state of fan 114 based on the volume level of the audio content crossing the set threshold value. For example, audio device 102 may turn on fan 114 when the determined volume level of audio content of a data stream rises above the set threshold value and may turn off fan 114 when the determined volume level of audio content of a data stream falls below the set threshold value.

In FIG. 1, audio device 102 may be connected to playback device 106 over communications link 126. Communications link 126 may be a unidirectional communications link. Specifically, audio device 102 may transfer a data stream over communications link 126 to playback device 106, but playback device 106 may not be operable to send requests or commands over communications link 126 to audio device 102. In an embodiment, communications link 126 may be digital communications link such as a High Definition Multimedia Interface (HDMI) cable. In another embodiment, communications link 126 may be an analog communications link such as a Radio Frequency (RF) cable or a Radio Corporation of America (RCA) connector cable.

In an embodiment, playback device 106 may be any electronics device operable to play audio content. For example, playback device 106 may be a television, audio/video (AV) receiver, speaker, or other multimedia and/or consumer electronic device. In an embodiment, playback device 106 may be operable to play back a data stream comprising digital audio content. In another embodiment, playback device 106 may be operable to play back a data stream comprising analog audio content, and/or a combination of digital and analog audio content.

In an embodiment, audio device 102 may be optionally controllable by remote control 108.

In FIG. 1, remote control 108 may refer to a remote control configured to control multiple audio devices 102. In an embodiment, remote control 108 may be operable to communicate requests, commands and/or audio from microphone 142 wirelessly to audio device 102 using infrared (IR) or RF signals or through some other communication medium/technique such as cellular or Bluetooth.

Audio device 102 may receive requests or commands from remote control 108 over communications link 122 using IR or RF signals. In an embodiment, audio device 102 may include a receiver 118. Receiver 118 may receive requests or commands from remote control 108 over communications link 122.

Remote control 108 may include a transmitter 120. Transmitter 120 may send requests or commands over communications link 122.

Figure 2:
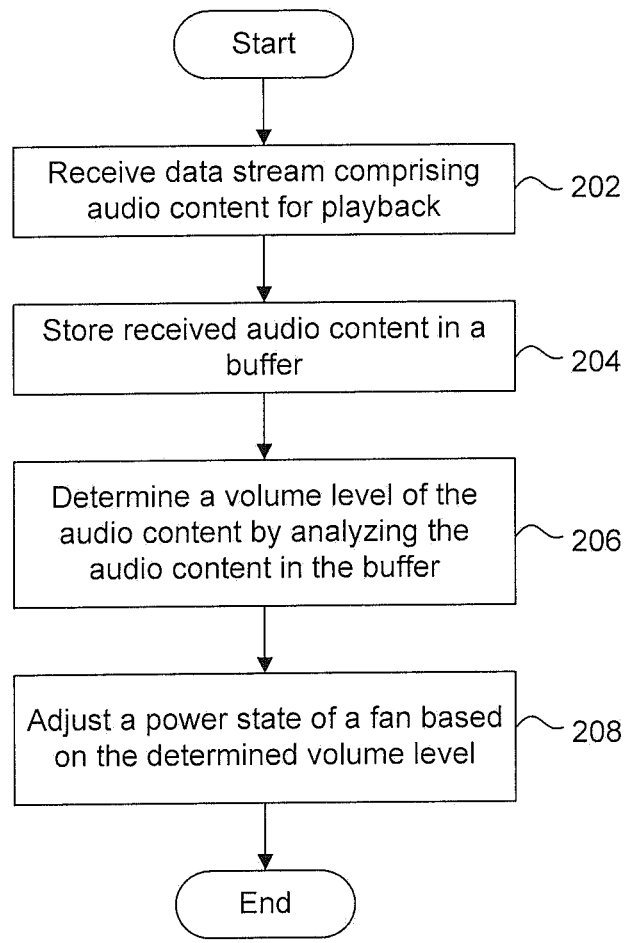
FIG. 2 is a flowchart illustrating a process for maintaining a temperature of an audio device during playback of data comprising audio content, according to an example embodiment.

FIG. 2 is a flowchart for a method 200 for maintaining a temperature of an audio device within certain parameters during playback of audio content in a manner that decreases or eliminates audio interference, according to an example embodiment. Method 200 is described with reference to FIG. 1; however, method 200 is not limited to that example embodiment. Method 200 can be performed by processing logic that can comprise hardware (e.g., circuitry, dedicated logic, programmable logic, microcode, etc.), software (e.g., instructions running on a processing device), or a combination thereof.

In step 202 of FIG. 2, audio device 102 receives a data stream comprising audio content for playback from data source 104 over communications link 124. As would be appreciated by a person of ordinary skill in the art, the data stream may be encoded in a UHD data format, FLV data format, QuickTime data format, WMV data format, MP3 data format, WMA data format, HLS (HTTP Live Streaming) or various other audio/video data and/or streaming formats.

In step 204 of FIG. 2, audio processor 110 decodes a portion of the received data stream and stores it in buffer 116. Alternatively, a portion of the data stream may be stored in buffer 116 and from there the audio processor 110 performs the decoding. In an embodiment, audio processor 110 may decode the next 60 to 90 seconds (or any other interval of time) of the received data stream in buffer 116. As would be appreciated by a person of ordinary skill in the art, audio processor 110 may normalize the volume level of the received data stream, apply video filters to the received data stream, apply audio filters to the received data stream, and/or apply various other effects to the received data stream.

In step 206 of FIG. 2, volume determiner 112 determines a volume level of the portion of audio content of the received data stream stored in buffer 116. Specifically, volume determiner 112 may determine the amplitude value of the portion of audio content in the data stream stored in buffer 116. As would be appreciated by a person of ordinary skill in the art, volume determiner 112 may determine an amplitude of the portion of audio content in the data stream stored in buffer 116 based on the data/streaming format of the received data stream.

In step 208, audio device 102 adjusts a power state of fan 114 based on the determined volume level of the portion of audio content stored in buffer 116. For example, audio device 102 adjusts a power state of fan 114 based on the determined volume level of the portion of audio content stored in buffer 116 compared to a threshold value. In an embodiment, if the determined volume level is less than or equal to the threshold value, the fan 114 is turned off or its speed is lowered. This will result in less audio distortion during low volume parts of the audio content. In contrast, if the determined volume level is greater than the threshold value, the fan 114 is turned on or its speed is increased. Such operation will result in less audio distortion because it occurs during a portion of the audio content when the volume level is greater.

Figure 3:
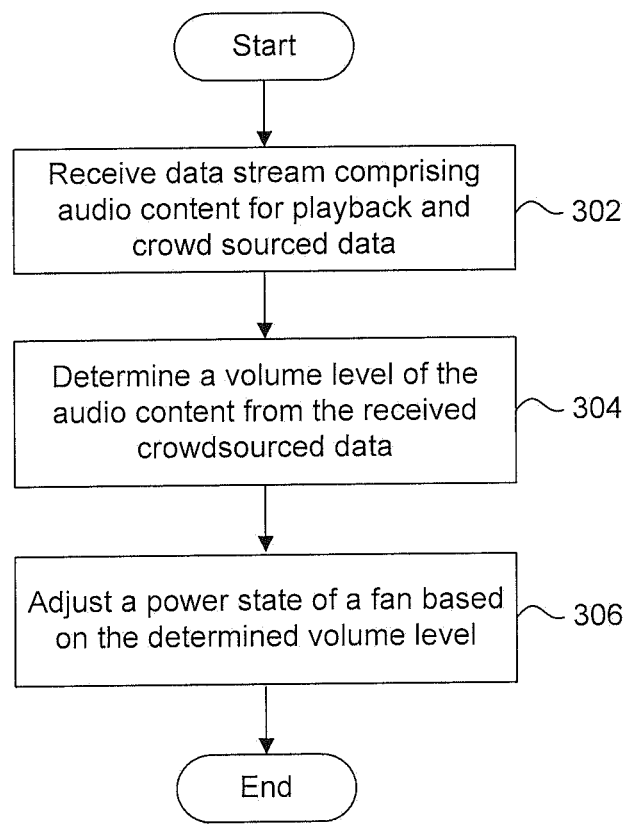
FIG. 3 is a flowchart illustrating a process for maintaining a temperature of an audio device during playback of data comprising audio content, according to an example embodiment.

FIG. 3 is a flowchart for a method 300 for maintaining a temperature of an audio device within certain parameters during playback of audio content in a manner that decreases or eliminates audio interference, according to another example embodiment. Method 300 is described with reference to FIG. 1, although it is not limited to this embodiment. Method 300 can be performed by processing logic that can comprise hardware (e.g., circuitry, dedicated logic, programmable logic, microcode, etc.), software (e.g., instructions running on a processing device), or a combination thereof.

In step 302 of FIG. 3, audio device 102 receives a data stream comprising audio content for playback and crowd sourced data from data source 104 over communications link 124. In an embodiment, the crowd sourced data may include data indicating audio amplitude volume levels during periodic time instances during playback of the data stream. Specifically, this crowd sourced data may be represented as a timeline of volume information for the data stream. An embodiment for generating such crowd sourced data is explained above with reference to FIG. 5. As would be appreciated by a person of ordinary skill in the art, audio processor 110 may normalize the volume level of the received audio content for playback, apply audio filters to the received audio content for playback, and/or apply various other effects to the received audio content for playback.

In step 304 of FIG. 3, volume determiner 112 determines a volume level of the received audio content using the received crowd sourced data. In an embodiment, volume determiner 112 determines the volume level of the received audio content at a given time instance during playback of the received data stream based on a corresponding amplitude value in the received crowd sourced data.

In step 306, audio device 102 adjusts a power state of fan 114 based on the determined volume level of the received audio content compared to a threshold value. The operation of step 306 is similar to the operation of step 208 in FIG. 2.

Figure 4:
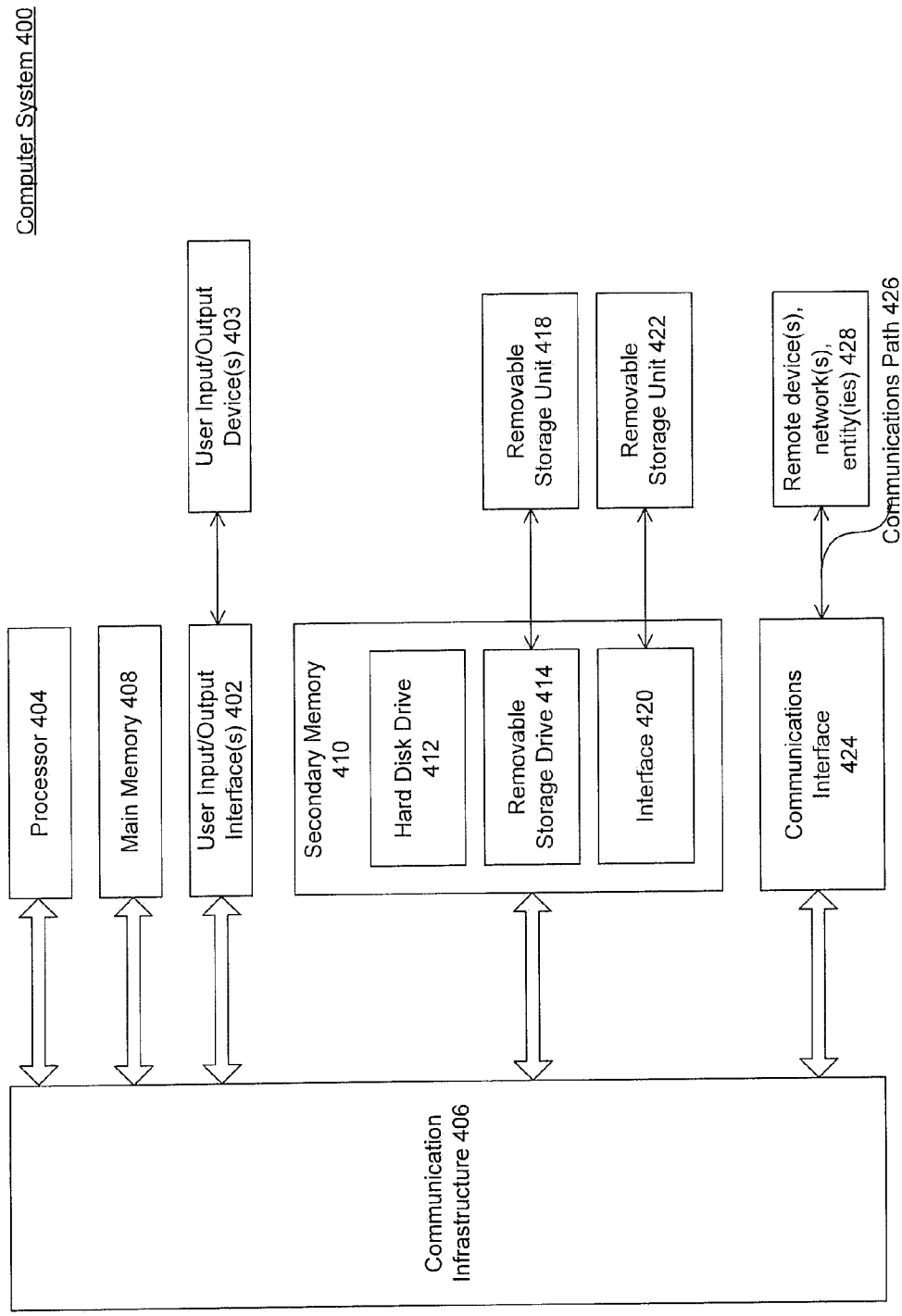
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for maintaining a temperature of an audio device within certain parameters during playback of audio content in a manner that decreases or eliminates audio interference, comprising:
    receiving a data stream comprising the audio content for playback;
    determining a volume level at a time portion of the audio content from crowd sourced metadata associated with the data stream, wherein the crowd sourced metadata comprises a timeline of volume information generated by a second audio device; and
    adjusting a power state of a cooling device during playback of the audio content by comparing the volume level at the time portion of the audio content to a threshold value, wherein the cooling device maintains the temperature of the audio device.

2. The computer implemented method of claim 1, wherein the threshold value is based on at least one of thermal characteristics of the audio device and audio characteristics of the data stream.

3. The computer implemented method of claim 1, wherein the determining comprises:
    analyzing the audio content in a buffer before playback.

4. The computer implemented method of claim 1, wherein the cooling device is a fan.

5. The computer implemented method of claim 1, wherein the adjusting comprises:
    setting the power state of the cooling device to a power on state based on the volume level at the time portion of the audio content being greater than the threshold value.

6. The computer implemented method of claim 1, wherein the adjusting comprises:
    setting the power state of the cooling device to a power off state based on the volume level at the time portion of the audio content being less than or equal to the threshold value.

7. The computer implemented method of claim 1, wherein the second audio device generates the timeline of volume information by recording volume levels of the audio content during playback of the audio content.

8. The computer implemented method of claim 7, wherein the second audio device records the volume levels of the audio content during playback of the audio content using a microphone.

9. An audio device, comprising:
    a cooling device configured to maintain a temperature of the audio device within certain operational parameters;
    a memory comprising a buffer; and
    at least one audio processor coupled to the memory and configured to:
        receive a data stream comprising audio content for playback;
        determine a volume level at a time portion of the audio content from crowd sourced metadata associated with the data stream, wherein the crowd sourced metadata comprises a timeline of volume information generated by a second audio device; and
        adjust a power state of a cooling device during playback of the audio content by comparing the volume level at the time portion of the audio content to a threshold value, wherein the cooling device maintains the temperature of the audio device.

10. The audio device of claim 9, wherein the threshold value is based on at least one of thermal characteristics of the audio device and audio characteristics of the data stream.

11. The audio device of claim 9, wherein to determine the volume level the audio processor is configured to:
    analyze the audio content in the buffer before playback.

12. The audio device of claim 9, wherein the cooling device is a fan.

13. The audio device of claim 9, wherein, to adjust the power state of the cooling device, the audio processor is configured to:
    set the power state of the cooling device to a power on state based on the volume level at the time portion of the audio content being greater than the threshold value.

14. The audio device of claim 9, wherein, to adjust the power state of the cooling device, the audio processor is configured to:
set the power state of the cooling device to a power off state based on the volume level at the time portion of the audio content being less than or equal to the threshold value.

15. A non-transitory tangible computer-readable device having instructions stored thereon that, when executed by at least one computing device, causes the at least one computing device to perform operations comprising:
receiving a data stream comprising audio content for playback;
determining a volume level at a time portion of the audio content from crowd sourced metadata associated with the data stream, wherein the crowd sourced metadata comprises a timeline of volume information generated by a second audio device; and
adjusting a power state of a cooling device during playback of the audio content by comparing the volume level at the time portion of the audio content to a threshold value, wherein the cooling device maintains a temperature of the audio device.

16. The non-transitory tangible computer-readable device of claim 15, wherein the threshold value is based on at least one of thermal characteristics of the audio device and audio characteristics of the data stream.

17. The non-transitory tangible computer-readable device of claim 15, wherein the determining comprises:
analyzing the audio content in a buffer before playback.

18. The non-transitory tangible computer-readable device of claim 15, wherein the cooling device is a fan.

19. The non-transitory tangible computer-readable device of claim 15, wherein the adjusting comprises:
setting the power state of the cooling device to a power on state based on the volume level at the time portion of the audio content being greater than the threshold value.

20. The non-transitory tangible computer-readable device of claim 15, wherein the adjusting comprises:
setting the power state of the cooling device to a power off state based on the volume level at the time portion of the audio content being less than or equal to the threshold value.

\* \* \* \* \*